(12) United States Patent
Vahedforough et al.

(10) Patent No.: US 12,026,229 B2
(45) Date of Patent: Jul. 2, 2024

(54) GENERATING SYNTHETIC TRAINING DATA FOR PERCEPTION MACHINE LEARNING MODELS USING SIMULATED ENVIRONMENTS

(71) Applicant: VOLKSWAGEN AKTIENGESELLSCHAFT, Wolfsburg (DE)

(72) Inventors: Elnaz Vahedforough, San Jose, CA (US); Adrienne Othon, Kensington, CA (US); Jens Langenberg, Redwood City, CA (US); Pratik P. Brahma, Belmont, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 364 days.

(21) Appl. No.: 17/514,862

(22) Filed: Oct. 29, 2021

(65) Prior Publication Data

US 2023/0135398 A1    May 4, 2023

(51) Int. Cl.
*G06F 18/00* (2023.01)
*G06F 18/214* (2023.01)
*G06N 20/00* (2019.01)
*G06T 7/136* (2017.01)
*G06T 19/00* (2011.01)

(52) U.S. Cl.
CPC ......... *G06F 18/2148* (2023.01); *G06N 20/00* (2019.01); *G06T 7/136* (2017.01); *G06T 19/003* (2013.01)

(58) Field of Classification Search
CPC ..... G06F 18/2148; G06N 20/00; G06T 7/136; G06T 19/003
See application file for complete search history.

(56) References Cited

U.S. PATENT DOCUMENTS

| 11,067,988 B1 * | 7/2021 | Faust ...................... G06N 3/006 |
| 11,386,663 B1 * | 7/2022 | Perea ...................... G06V 20/46 |
| 2019/0180502 A1 * | 6/2019 | England .................. G01S 7/417 |

(Continued)

OTHER PUBLICATIONS

Espadinha et al., LiDAR Data Noise Models and Methodology for Sim-to-Real Domain Generalization and Adaptation in Autonomous Driving Perception, 2021 IEEE Intelligent Vehicles Symposium (IV), pp. 797-803, Jul. 11-17 (Year: 2021).*

*Primary Examiner* — Ping Y Hsieh
*Assistant Examiner* — Xiao Liu

(57) ABSTRACT

A method is provided. The method includes generating a set of candidate training data based on a simulated environment and a first set of environmental parameters. The method also includes training a machine learning model based on the set of candidate training data. The method further includes obtaining a set of segmentations based on the machine learning model and a set of test data. The method further includes determining whether a mean intersection-over-union (MIOU) of the set of segmentations has increased by more than a threshold change. The method further includes generating a next set of candidate training data based on the simulated environment and a second set of environmental parameters for the simulated environment, in response to determining that the MIOU has increased by more than the threshold MIOU amount.

20 Claims, 8 Drawing Sheets

(56) References Cited

U.S. PATENT DOCUMENTS

| | | | |
|---|---|---|---|
| 2020/0184027 A1* | 6/2020 | Dolan | G01S 13/931 |
| 2021/0286923 A1* | 9/2021 | Kristensen | G01S 7/412 |
| 2022/0242401 A1* | 8/2022 | Thompson | G06F 1/14 |

* cited by examiner

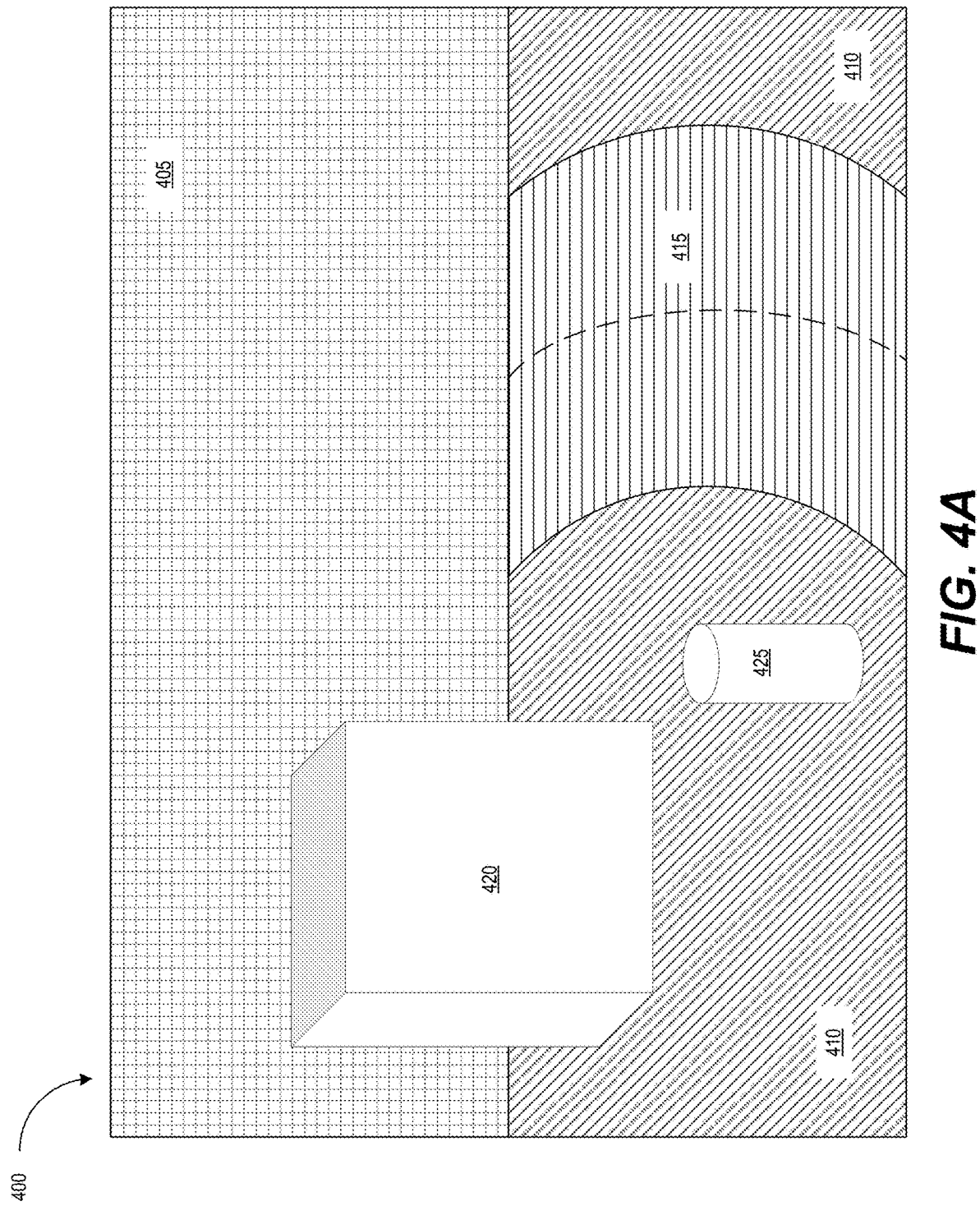

GENERATING SYNTHETIC TRAINING DATA FOR PERCEPTION MACHINE LEARNING MODELS USING SIMULATED ENVIRONMENTS

TECHNICAL FIELD

Aspects of the present disclosure relate to machine learning models, and more particularly, to generating training data and training machine learning models.

BACKGROUND

As devices become more complex and as more devices operate autonomously (e.g., autonomous vehicles (AVs)), machine learning (ML) models, artificial intelligence (AI) models, etc., are often used to control the operation of these complex and/or autonomous devices. Developing these models may be an expensive and time consuming process. It may be difficult to gather training data and to clean/process the training data. It may also be difficult to obtain training data to be used to train a model. In addition, many of the processes or workflows for developing these models is manual (e.g., manually performed by a data scientist/engineer).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4A is a diagram that illustrates example segmentations of an image, in accordance with one or more embodiments of the present disclosure.

DETAILED DESCRIPTION

Figure 1:
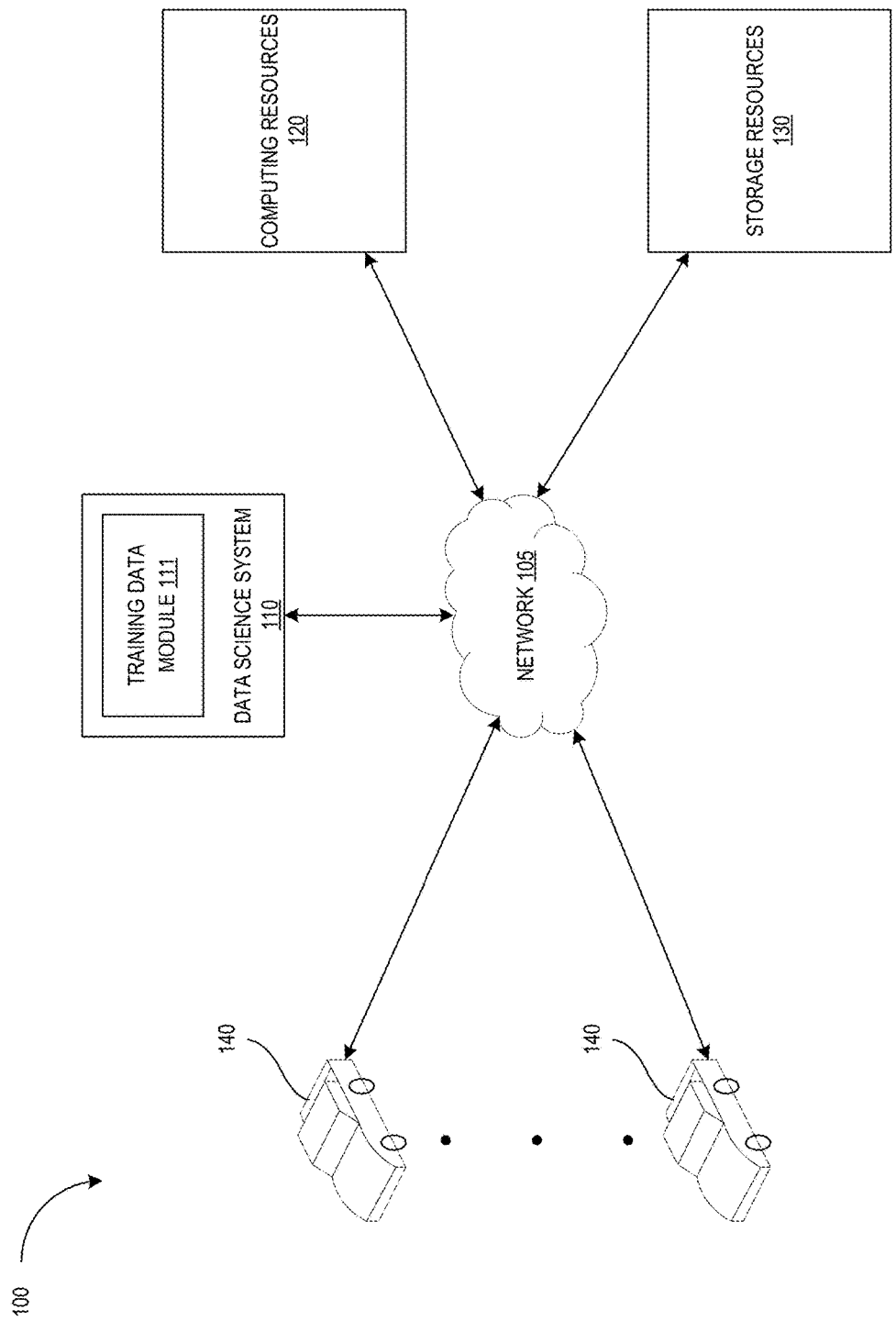
FIG. 1 is a block diagram that illustrates an example system architecture, in accordance with one or more embodiments of the present disclosure.

Developing machine learning models (e.g., artificial intelligence (AI) models) for autonomous functions are an increasingly time-consuming and difficult task. Users (e.g., data scientists and/or data engineers) may perform various functions, tasks, etc., when developing the machine learning models. The user may also manage the sensor data that is received from various vehicles (e.g., a fleet of vehicles). These tasks are often manually performed which is time consuming. In addition, these tasks are also prone to error because they are manually done (e.g., users may forget a task or perform a task differently).

Obtaining training data is often a time consuming, manual, and/or difficult task when developing machine learning models. The training data is a set of data which may be used to train, configure, set weights, etc., of a machine learning model. It is often difficult to obtain new or additional training data. Sensor data (e.g., videos, images, CAN data, etc.) can be difficult to obtain and may need to be manually processed/analyzed by a user. However, having a variety of training data may allow machine learning models to be better trained and/or to be more generalized. Thus, it is useful to generate new training data more quickly and/or efficiently.

The examples, implementations, and embodiments described herein may help address these issues when training and/or developing machine learning models. In one embodiment, a data science system provides an end-to-end platform that supports ingesting the data, view/browsing the data, visualizing the data, selecting different sets of data, processing and/or augmenting the data, provisioning of computational and storage resources, and testing machine learning models. The data science system supports multiple workflows or processes within a single ecosystem/platform which allows users to transition between different phases of the development cycle more easily. The data science system also automates various tasks such as generating training data (such as synthetic training data generated using a simulated environment) and determining whether the training data improves the operation of machine learning models. The simulated environment may be used to generate training data that simulates a problem domain (e.g., scenarios, conditions, etc., that may be encountered by a vehicle). Generating training data (e.g., synthetic training data) through simulation and/or simulated environments may generally be less expensive, less dangerous, and may provide more flexibility to control parameters (e.g., environmental parameters such as weather, lighting, vehicle dynamics, material properties, etc.). Adding synthetic training data (which may also be referred to as synthetic training data) to the training process may improves the performance of machine learning models (e.g., perception models) under various conditions. This may help improve the quality of the machine learning models that are developed and/or may decrease the amount of time to develop the machine learning models. Some embodiments may provide a method to tune environmental parameters by quantifiable amounts to optimize a machine learning model's performance (e.g., by generating synthetic training data used to train the machine learning model) under test domain conditions.

Although the present disclosure may refer to machine learning models, the examples, implementations, aspects, and/or embodiments described herein may be used with other types of machine learning or artificial intelligence systems/architectures. Examples of machine learning models may be driver assistant models (e.g., a ML/AI model that may assist a driver of a vehicle with the operation of the vehicle), semi-autonomous vehicle models (e.g., a ML/AI model that may partially automate one or more functions/operations of a vehicle), a perception model such as a ML/AI model that is used to identify or recognize pedestrians, vehicles, etc.), etc.

FIG. 1 is a block diagram that illustrates an example system architecture 100, in accordance with some embodiments of the present disclosure. The system architecture 100 includes a data science system 110, computing resources 120, storage resources 130, and vehicles 140. One or more network may interconnect the vehicles 140, the data science system 110, the computing resources 120, and/or the storage resources 130. A network may be a public network (e.g., the internet), a private network (e.g., a local area network (LAN) or wide area network (WAN)), or a combination thereof. In one embodiment, network may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc. The network may carry communications (e.g., data, message, packets, frames, etc.) between the vehicles 140, the data science system 110, the computing resources 120 and/or the storage resources 130.

The vehicles 140 may be commercial vehicles, test vehicles, and/or may be autonomous vehicles (AVs). In one embodiment, the vehicles 140 may be a fleet of vehicles that are used to collect, capture, gather, compile, etc., sensor data and/or other data that may be used to develop, improve, refine, or enhance machine learning models. Machine learning models may be models that may be used to manage and/or control the operation of a vehicle. Each of the vehicles 140 may include various sensors that may generate data (e.g., sensor data) as the respective vehicle operates (e.g., drives, moves around, or is otherwise on). Examples of sensors may include, but are not limited to, tire pressure sensors, steering sensors (e.g., to determine the positions/angles of one or more wheels), a compass, temperature sensors, a global positioning system (GPS) receiver/sensor, a light detection and ranging (LIDAR) device/sensor, an ultrasonic device/sensor, a camera (e.g., a video camera), a radar device/sensor, etc. The sensors of the vehicles 140 may generate sensor data such as video data, image data, GPS data, LIDAR data, time series data, etc. Each of the vehicles 140 by way of its sensors may generate gigabytes (e.g., tens, hundreds, thousands, etc., of gigabytes) of data per hour of operation.

The computing resources 120 may include computing devices which may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the data science system 110, one or more of the computing resources 120 and the storage resources 130 may be part of the data science system 110 in other embodiments. For example, the data science system 110 may include both the computing resources 120 and the storage resources 130.

In one embodiment, the data science system 110 may be an application and data-source agnostic system. For example, the data science system 110 may be able to work with a multitude of different applications, services, etc., and may be able to ingest data from various different sources of data (e.g., ingest multiple types/formats of data from multiple types and/or brands of sensors). The data science system 110 may provide a cloud-based infrastructure (e.g., computing resources 120 and/or storage resources 130) that may be tailored/customized for the development of machine learning models (e.g., neural networks, statistical models, rule-based models, etc.). The data science system 110 may support the various workflows, processes, operations, actions, tasks, etc., in the development cycle for machine learning models. The development cycle for a machine learning model may be referred to as a loop, a development loop, a big loop, a development process, etc. The development cycle may include the ingestion of data from the vehicles 140. The data may be selected, processed, cleaned, analyzed, annotated, visualized (e.g., viewed). Computational resources 120 and storage resources 130 may be allocated to develop machine learning models using the data and/or to store modifications to the data. The machine learning models may be deployed in the vehicles for testing and additional data may be collected. Other models (e.g., driver assistant models, semi-autonomous vehicle models, perception models, etc.), may also be deployed in the vehicles for testing. The additional data may be ingested by the data science system 110 and may be used to develop further machine learning models or update/improve existing machine learning models, restarting the development cycle.

In one embodiment, data (e.g., sensor data such as CAN data, images, videos, GPS data, LIDAR data, speed, acceleration, etc.) may be received, collected, ingested, etc., from vehicles 140 (e.g., a fleet of vehicles). The data may be processed, cleaned, formatted, scrubbed, massaged, for further feature labelling, annotation, extraction, manipulation, and/or processing. Users (e.g., data scientists and/or data engineers) may be use the data science system 110 to explore the data (e.g., using a data explorer or data visualizer to search for certain types of data, metadata, annotations, etc.) and to create, test, update, and/or modify various machine learning models.

In one embodiment, the data science system 110 may enable end-to-end development and/or testing of AV models and/or other AV functions. The data science system 110 may streamline, simplify, and/or automate (e.g., fully automate or at least partially automate) various tasks related to the development and/or testing of machine learning models. For example, the data science system 110 may streamline and/or automate the generation of training data, and training machine learning models using the generated training data. The data science system 110 may allow for a faster and/or more efficient development cycle.

In one embodiment, the data science system 110 may manage the allocation and/or use of computing resources 120 (e.g., computing clusters, server computers, VMs, containers, etc.). The computing resources 120 may be used for data transformation, feature extraction, development, generating training data, and testing of machine learning models, etc. The computing resources 120 may use various cloud service platforms (e.g., cloud computing resources). The data science system 110 may also manage the allocation and/or use of storage resources 130. The storage resources 130 may store training data, machine learning models, and/or any other data used during the development and/or testing of machine learning models.

In one embodiment, the training data module 111 may generate training data that is used to train various machine learning models (e.g., autonomous vehicle models, perception models, object detection models, neural networks, etc.). For example, the training data module 111 may use a simulation engine to generate simulated environments, as discussed in more detail below. The candidate training data may be obtained based on the simulated environments. The training data module 111 may determine whether the candidate training data improves the performance of a machine learning model (e.g., improves the performance by a threshold amount). If the candidate training data does improve the performance of the machine learning model, the training data module 111 may add the training data module to a set or library of training data (which may be used to train other/future machine learning models). The candidate training data may also be referred to as synthetic data or synthetic training data. Synthetic data (or synthetic training data) may be data (e.g., images, videos, etc.) that are generated based on a simulated environment (e.g., generated using a simulation engine).

In one embodiment, the training data module 111 may be able to generate tens, hundreds, thousands, millions, etc., of simulated environments. Various environmental parameters such as the size, texture, color, shape, etc., of the objects, buildings, etc., in the simulated environments may be changed (e.g., non-deterministically or randomly changed) between the different simulated environments. The lighting (e.g., lighting, glare, sources of light, shadows, etc.) and/or weather conditions may also be changed in different simulated environments. The terrain (e.g., desert, road, forest, mountains, etc.) may also be changed in different simulated environments. The road type (e.g., asphalt, dirt, concrete, paved stones, etc.) may also be changed in different simulated environments. The road color and/or texture may also be changed in different simulated environments. In addition, the amount of light reflection on a road may also be changed in different simulated environments. This may allow the training data module 111 to generate a multitude of images (e.g., training data and/or candidate training data) with varying objects, environments, lighting, terrain, textures, etc. The large number of variations in training data (e.g., the large number of varying objects, textures, environments, etc.) may be difficult to obtain in real world scenarios. In one embodiment, an environmental parameter may be any parameter, setting, configurations, etc., that may change the way a simulated environment looks, is presented, is displayed, etc.

The training data that may be generated by the training data module 111 may allow the machine learning model to generalize better in different scenarios, conditions, situations, circumstances, and/or environments. Because the training data module 111 may randomly vary objects, routes, textures, terrain, weather/light conditions, etc., this may expose the machine learning model to more variations in training data which may help prevent overfitting. In addition, because of the multiple of variations in the training data (e.g., the images), the training data may include various corner cases or unlikely scenarios, conditions, situations, circumstances, and/or environments which may also be useful when training the machine learning model. Furthermore, the training data generated by the training data module 111 may be generated automatically, which may reduce the time and effort for creating/obtaining training data.

In one embodiment, the vehicle 140 may determine whether the output of a machine learning model deviates from a reference output (e.g., a reference action, etc.). If the machine learning model deviates from the reference, the vehicle may transmit data (e.g., sensor data and/or other information) to the data science system 110 (e.g., to the training data module 111) indicating that a scenario, condition, situation, etc., occurred in which the machine learning model deviated from the reference. The vehicle 140 may also include a recording system that may detect when corner cases, scenarios, conditions, etc., have occurred and may record sensor data (e.g., video, images, etc.) when the corner cases, scenarios, conditions, etc. occur. The training data module 111 may generate training data (e.g., synthetic training data) based on the scenario, condition, situation, etc., that occurred (e.g., based on sensor data and/or other information that may represent the scenario, condition, situation, etc.).

In some embodiments, machine learning models may be trained using the variety of training data generated by the training data module 111. The training data may include varied weather conditions, lighting conditions, objects, textures, etc. The use of varied training data may help prevent the overfitting of the machine learning models (e.g., perception models) to known, realistic objects and allow the machine learning models to generalize to broader scenarios. Also generation of the training data and scenarios may be more cost efficient when compared to using realistic or hi-fidelity simulation models of realistic scenarios. This technique may allow a larger amount of training data to be generated more quickly and/or automatically.

Figure 2:
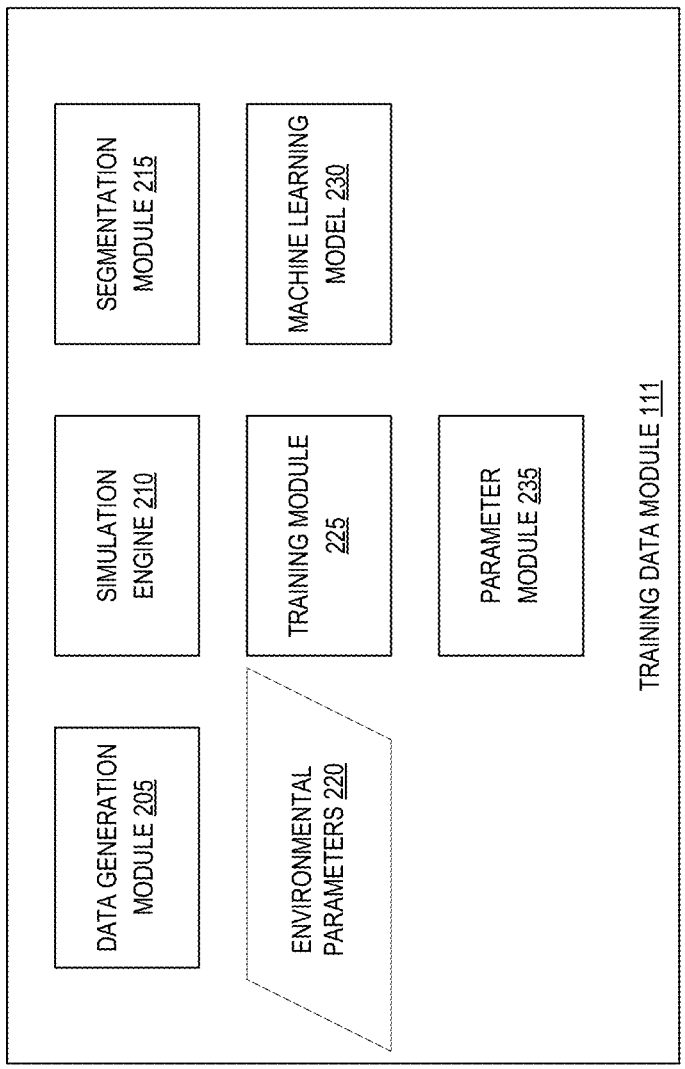
FIG. 2 is a diagram illustrating an example training data module, in accordance with one or more embodiments of the present disclosure.

FIG. 2 is a block diagram that illustrates an example training data module 111, in accordance with one or more embodiments of the present disclosure. The training data module 111 includes a data generate module 205, a simulation engine 210 a segmentation module 215, environmental parameters 220, a training module 225, a machine learning model 230, and a parameter module 235. Some or all of the modules, components, systems, engines, etc., illustrated in FIG. 2 may be implemented in software, hardware, firmware, or a combination thereof. Although the simulation engine 210 is illustrated as part of the training data module 111, the simulation engine 210 may be separate from the training data module 111 in other embodiments.

In one embodiment, the training data module 111 may be part of a data science system (e.g., data science system 110 illustrated in FIG. 1). As discussed above, the data science system may allow users to generate training data and to develop (e.g., code), refine, modify, train, and/or machine learning models (e.g., perception models, driver assistance models, AV models, neural networks, object detection, segmentation, etc.). For example, the data science system may include computing devices, virtual machines, integrated development environments (IDEs), libraries, applications, etc., that allow users (e.g., engineers, coders, data scientists, etc.) to create, code, develop, generate, train, etc., various perception models (e.g., to create neural networks). In other embodiments, the training data module 111 may be separate from a data science system. For example, the training data module 111 may be a separate set of computing devices and/or computing resources that are used to generate training data and/or test perception models.

The training data module 111 may allow users to generate training data and train machine learning models using training or test data. For example, the training data module 111 may allow users to execute machine learning model 230 (e.g., a perception model, a neural network, etc.) using training data, candidate training data, test data, etc. The training data may be automatically generated by the training data module 111. The training data module 111 may also generate a wide variety of training data based on various environmental parameters (as discussed above). This allows the machine learning model to generalize better in different scenarios, conditions, situations, circumstances, and/or environments.

In one embodiment, the simulation engine 210 may include hardware, software, firmware, or a combination thereof that allows users to create simulated environments. The simulation engine 210 may also be referred to as a game engine. A simulated environment may be a virtual construct, similar to a video game, computer game, etc. The simulated environment may enforce various rules, such as the laws of physics. The simulated environment may allow simulated objects to move and/or interact with each other in the simulated environment. A simulated environment may also be referred to as a virtual environment.

In one embodiment, the data generation module 205 may generate a set of candidate training data based on a simulated environment (generated or created by the simulation engine 210) and a set of environmental parameters 220 for the simulated environment. For example, the data generation module 250 may obtain images of the simulated environment using different weather, lighting conditions, etc., that are indicated/specified by the environmental parameters 220.

In one embodiment, the training module 225 may train the machine learning model 230 based on the set of candidate training data generated by the data generation module 205. For example, the training module 225 may provide the candidate training data to the machine learning model 230 as an input, to set/configure weights or other parameters of the machine learning model 230.

In one embodiment, the segmentation module 215 may obtain a set of segmentations based on the machine learning model 230 and a set of test data (e.g., data that may be used to test the machine learning model 230 after it has been trained using the set of candidate training data). For example, a set of data (e.g., a set of images) separate from the training data and/or candidate training data may be provided to the machine learning model. The set of test data may be associated with a set of reference outputs, references results, reference segmentations, etc. For example, the set of reference segmentations may be expected segmentations for a set of images. The set of segmentations may indicate features of the simulated environment identified by the machine learning model 230. For example, a segmentation may indicate pedestrians detected by the machine learning model 230. In another example, a segmentation may indicate vehicles detected by the machine learning model 230. In a further example, a segmentation may indicate lane markings detected by the machine learning model 230. The segmentation module 215 may determine the set of segmentations based on outputs generated by the machine learning model 230. For example, the segmentation module 215 may analyze coordinates, bounding boxes, identifiers (e.g., alphanumeric values), etc., generated by the machine learning model 230 to determine the segmentations.

In one embodiment, the segmentation module 215 may determine whether a mean intersection-over-union (MIOU) of the set of segmentations has increased by more than a threshold change (e.g., may determine whether the performance of the machine learning model 230 has improved). For example, the segmentation module 215 may determine whether the MIOU of the set of segmentations has increased over a previous MIOU (of a previous set of segmentations). The segmentation module 215 may compare the segmentations generated by the machine learning model 230 using the test data, with a set of reference segmentations for the test data to determine the MIOU. If the MIOU of the set of segmentations has increased over the previous MIOU, the segmentation module 215 may determine the amount of increase/change (e.g., the difference between the MIOU and the previous MIOU). A MIOU may be an evaluation metric for image segmentation (e.g., for dividing an image into different portions which correspond to types of objects, textures, etc., in an image). The MIOU may be determined by first determining (e.g., computing) an intersection of union for each segment (e.g., each type of segment, each semantic class) and the determining the average over all of the segments.

In one embodiment, the segmentation module 215 may cause a next set of candidate training data to be generated when the MIOU has increased by more than the threshold amount. For example, the segmentation module 215 may cause or send a message to the data generation module 205 to generate a next set of candidate training data. The data generation module 205 may generate the next set of candidate training data based on a next (e.g., a new) simulated environment (generated by the simulation engine 210 based on a next/new set of environmental parameters).

In one embodiment, the training module 225 may train or retrain the machine learning model 230 based on the next, additional, new, etc., sets of candidate training data. For example, each time the data generation module 205 generates a set of candidate training data, the training module 225 may retrain the machine learning model 230 using the set of candidate training data (generated by the data generation module 205).

In one embodiment, the segmentation module 215 may determine whether the MIOU is more than a threshold MIOU when the MIOU has not increased by the threshold change. For example, the segmentation module 215 may determine that the MIOU has not increased or has not increased by a threshold amount. If the MIOU has not increased by the threshold change, the segmentation module 215 may determine whether the MIOU is greater than a threshold MIOU (e.g., whether the MIOU is greater than a minimum/threshold MIOU value, a desired MIOU increment value, etc.).

In one embodiment, the segmentation module 215 may cause the candidate training data to be added (e.g., included) to a set, library, etc., of training data if the MIOU is greater than the threshold MIOU. For example, the segmentation module 215 may add the candidate data or may instruct another module (e.g., the data generation module 205) to add the candidate data. The set, library, etc., of training data may be used to train a final version of the machine learning model 230 and/or other machine learning models. If the MIOU is not greater than the threshold MIOU, the segmentation module 215 may not add the candidate training data to the set, library, etc., of training data. For example, the segmentation module 215 may discard the candidate training data. The segmentation module 215 may also cause one or more of the environmental parameters 220 to be modified, updated, etc. For example, if the set of candidate data was generated using a new value for an environmental parameter 220, data generation module 205 may discard the new value for the environmental parameter and revert/reset to a previous value (e.g., a previous value from a previous iteration). The new value may be discarded if the MIOU did not improve by a threshold amount and/or decreased from the previous MIOU value (e.g., the previous MIOU value from a previous iteration). In another example, if the set of candidate data was generated using a new value for an environmental parameter 220, data generation module 205 may change the step/increment size for the environmental parameter 220. For example, if the new value was changed by a step/increment size (e.g., by steps/increments of 1), the data generation module 205 may revert to a previous value and increase the previous value by a smaller step/increment size (e.g., by steps/increments of 0.5).

In one embodiment, the data generation module 205 may generate a set of images based on a set of simulated environments (e.g., one or more simulated environments). For example, the data generation module 205 may use the simulation engine 210 to drive, move, etc., a simulated vehicle (e.g., a virtual vehicle or other virtual/simulated object) through each simulated environment of the set of simulated environments. The simulated vehicle may drive/move along the path. As the simulated vehicle drives/moves along the path, the simulation engine 210 may provide a view of the simulated environment from the perspective of the simulated vehicle. This may be similar to a first person view of an environment or location within a game, a video game, a computer game, etc. The data generation module 205 may capture, store, save, etc., the views of the simulated environment as the simulated vehicle drives/moves along the path. The data generation module 205 may store the views of the simulated environments as images, pictures, a digital video, etc. The data generation module 205 may capture, record, etc., the views/images at different rates. For example, the data generation module 205 may capture, record, etc., thirty views/images per second, sixty views/images per second, or some other appropriate number of views/images per second. The images/views may be stored and used as training data for training various perception models (e.g. machine learning models, perception models, end-to-end neural networks, etc.).

As discussed above, the views of the simulated environment may be from the perspective of the simulated vehicle. In one embodiment, the views of the simulated environment may correspond to the location of a sensor within a vehicle that corresponds to or is associated with the simulated vehicle. For example, the simulated vehicle may represent a particular make and/or model of a real/physical vehicle. The real/physical vehicle may have a camera (e.g., a sensor) located at a particular location on the real/physical vehicle (e.g., located above the rear view mirror, located on a trunk, located on a front grill, etc.). The perspective of the views may correspond to the location of the camera. For example, the perspective of the views may be the same as perspective of the views (e.g., images) that would be generated by the camera of real/physical vehicle if the real/physical vehicle had traveled along path. This allows the machine learning model 230 (e.g., a neural network) to be configured, adapted, customized, etc., for different makes and/or models of vehicles which may have sensors (e.g., cameras) at different locations. In one embodiment, the view of the simulated environment may be adjusted, calibrated, etc., based on the location of a sensor (e.g., a camera) on a real/physical vehicle. For example, the positioned and/or orientation of the view may be calibrated/adjusted such that the perspective of the view matches the perspective of the views (e.g., images) that would be generated by the camera of real/physical vehicle if the real/physical vehicle had traveled along path. The view may also be calibrated/adjusted based on characteristics, properties, parameters, of the camera of the real/physical vehicle. For example, parameters such as focal length, frame rate, exposure times, resolution, etc., may also be calibrated/adjusted.

In one embodiment, the environmental parameters 220 may indicate one or more of locations, shapes, orientations, colors, textures, sizes, etc., for objects within a simulated (e.g., virtual) environment. For example, the environmental parameters 220 may indicate that one or more objects should have a certain height, size, shape, etc. The locations, shapes, orientations, colors, textures, sizes, etc., for objects may be selected non-deterministically (e.g., randomly). The simulation engine 210 may generate a simulated environment that includes the objects with the heights, sizes, shapes, textures, etc., indicated by the environmental parameters 220. The data generation module 205 may generate the candidate training data (e.g., images) based on the simulated environment (e.g., by obtaining images of the virtual environment, as discussed above). In some embodiments, the objects within a simulated environment (e.g., pedestrians, buildings, vehicles, etc.) may not be realistic and/or may not have standard shapes or outlines. For, example, the edge of a building may be jagged or wavelike.

In one embodiment, the environmental parameters 220 may indicate a weather condition within a simulated (e.g., virtual) environment. For example, the environmental parameters 220 may indicate that the weather within the simulated environment should include, rain, sleet, snow, clouds, wind, etc. The weather condition may be selected non-deterministically (e.g., randomly). The simulation engine 210 may generate a simulated environment that includes the weather condition indicated by the environmental parameters 220. The data generation module 205 may generate the candidate training databased on the simulated environment, as discussed above.

In one embodiment, the environmental parameters 220 may indicate one or more lighting conditions within a simulated (e.g., virtual) environment. For example, the environmental parameters 220 may indicate the locations of light sources, the colors of the light sources, the intensities (e.g., brightness) of the light sources, the intensities (e.g., darkness) of shadows, etc. The one or more lighting conditions may be selected non-deterministically (e.g., randomly). The simulation engine 210 may generate a simulated environment that includes the one or more lighting conditions indicated by the environmental parameters 220. The data generation module 205 may generate the candidate training databased on the simulated environment, as discussed above.

In one embodiment, the environmental parameters 220 may indicate one or more colors within a simulated (e.g., virtual) environment. For example, the environmental parameters 220 may indicate the colors of objects, vehicles, pedestrians, traffic control devices (e.g., signs, lane markings, traffic cones, etc.). The one or more colors may be selected non-deterministically (e.g., randomly). The simulation engine 210 may generate a simulated environment that includes the colors indicated by the environmental parameters 220. The data generation module 205 may generate the candidate training databased on the simulated environment, as discussed above.

In one embodiment, the environmental parameters 220 may include a range of values for each of the environmental parameters 220. For example, if an environmental parameter 220 is an intensity (e.g., brightness) of a light, another environmental parameter 220 (or additional data for the environmental parameter 220) may indicate the range of intensity values. In another example, if an environmental parameter 220 is a color of an object, another environmental parameter 220 (or additional data for the environmental parameter 220) may indicate all of the possible colors for the object. In a further example, if an environmental parameter 220 is a size of an object, another environmental parameter 220 (or additional data for the environmental parameter 220) may indicate all of the possible sizes for the object.

In one embodiment, the environmental parameters 220 may include increments of change for the values of the environmental parameters 220. For example, if an environmental parameter 220 is an intensity (e.g., brightness) of a light ranging from 0 (e.g., complete darkness) to 10 (e.g., very bright), another environmental parameter 220 (or additional data for the environmental parameter 220) may indicate the shadow intensity of light can be changed in increments of 0.1, 0.5, etc.

In some embodiments, the increments of change (e.g., step sizes) for the values of the environmental parameters 220 may be modified as candidate training data is generated and evaluated. For example, during one or more previous iterations of process for generating training data (e.g., process 300 illustrated in FIG. 3), the intensity of light may have been changed (e.g., increased or decreased) in increments of 0.1. The increment may be changed to 0.5 for later iterations.

In one embodiment, the parameter module 235 may select a set (e.g., one or more) of environmental parameters 220 to change, update, modify, etc., when new candidate training data (e.g., a next set of candidate training data) is generated by the data generation module 205 (using the simulation engine 210). The parameter module 235 may select the set of environmental parameters 220 to change based on one or more MIOUs (e.g., a current MIOU and a previous MIOU). For example, if the previous MIOU did not increase or did not increase by a threshold amount, the parameter module 235 may select new environmental parameters 220 that were not modified in a previous iteration. In another example, if the MIOU did not increase by the threshold amount, the parameter module 235 may change a currently selected set of environmental parameters 220 by a different amount. For example, the parameter module 235 may change the increments, step size, etc., for changing an environmental parameter (e.g., may increase or decrease the increment/step size used to change the environmental parameter. In another example, rather than increasing a value of an environmental parameter 220, the parameter module 235 may decrease the value.

Figure 3:
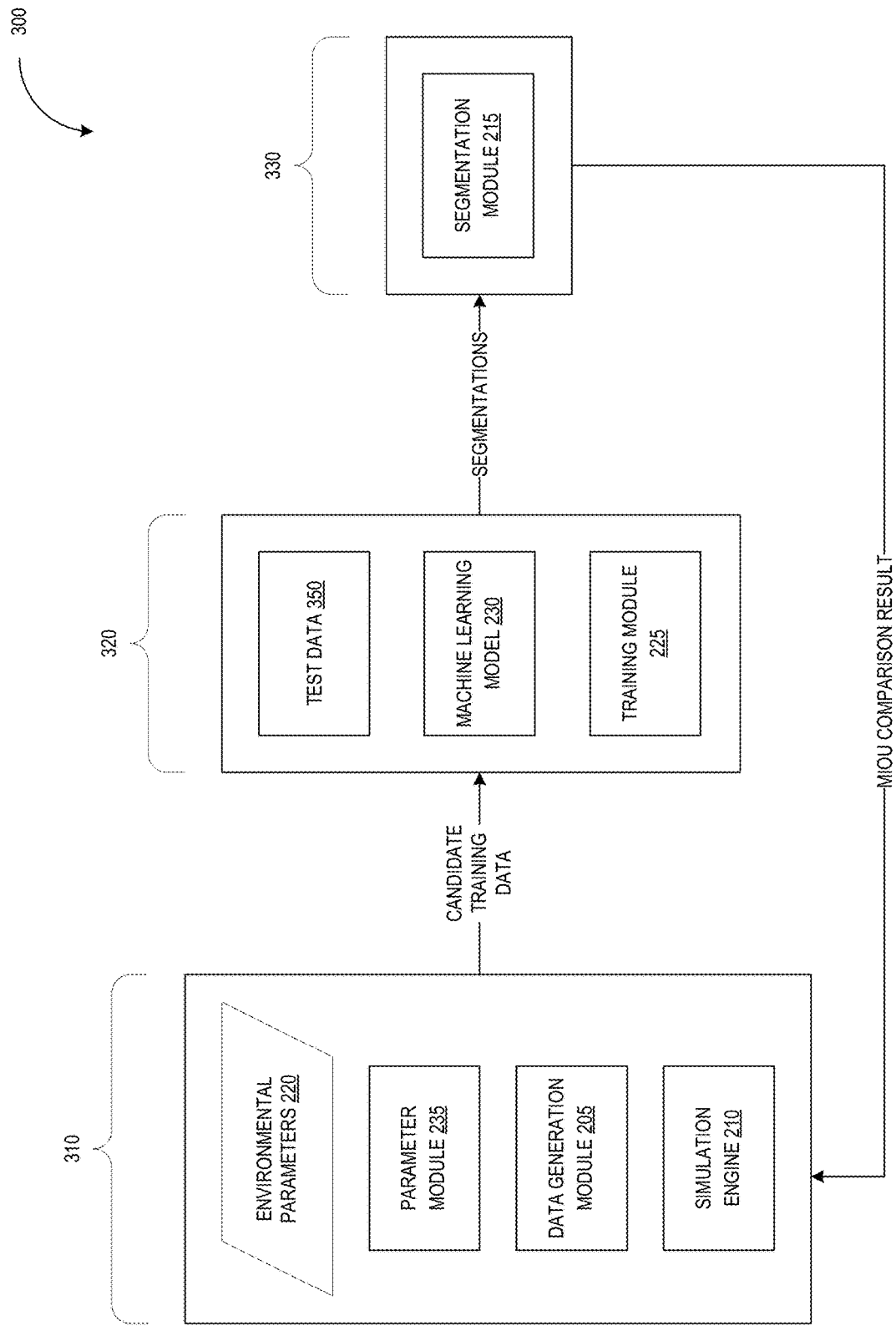
FIG. 3 is a block diagram that illustrates an example process for generating training data, in accordance with one or more embodiments of the present disclosure.

FIG. 3 is a block diagram that illustrates an example process 300 for generating training data (e.g., synthetic data or synthetic training data), in accordance with one or more embodiments of the present disclosure. The process 300 may be referred to as a cycle, loop, etc. The process 300 may be performed by the various modules, engines, components, and/or systems of the training data module 111 (illustrated in FIGS. 1 and 2). The process 300 includes three stages (e.g., phases, parts, portions, etc.), stage 310, stage 320, and stage 330. The process 300 may proceed from stage 310, to stage 320, to stage 330, and back to stage 310. Each iteration of the process 300 may generate a set of candidate training data (e.g., training data that will be evaluated, tested, etc., to determine if the training data should be added to a library of training data). The process 300 may iterate through the stages 310 through 330 until one or more conditions are satisfied (e.g., a number of iterations has been reached, a threshold MIOU is reached, etc.).

In stage 310, the parameter module 235 may select, identify, determine, etc., one or more environmental parameters 220 to modify, change, update, etc. The parameter module 235 may select the one or more environmental parameters (to modify/change) based on a previous MIOU value for a previous set of candidate training data. For example, if the previous MIOU did not increase or did not increase by a threshold amount, the parameter module 235 may select new environmental parameters 220 that were not modified in a previous iteration of the process 300.

In one embodiment, the parameter module 235 may change the increment or step size that is used to modify an environmental parameter 220. For example, if previous iterations of the process 300 changed an environmental parameter by 1 (e.g., increased/decreased the environmental parameter in steps of 1), the process 300 may change the increment to 0.5 (e.g., may increase/decrease the environmental parameter in steps of 0.5).

Also in stage 310, the data generation module 205 may generate the set of candidate training data based on the environmental parameters 220 (e.g., which may have been modified by the parameter module 235) and the simulation engine 210. For example, the simulation engine 210 may generate a simulated environment based on the environmental parameters 220 (e.g., may generate a simulated environment with objects, roads, buildings, lighting conditions, weather conditions, etc., based on the environmental parameters 220). The data generation module 205 may obtain images, videos, etc., of the simulated environment (e.g., from the point of view of a simulated vehicle driving within the simulated environment) to generate the set of candidate training data.

At stage 320, the training module 225 may train the untrained machine learning model 230 based on the set of candidate training data generated at stage 310. For example, the training module 225 may provide the set of candidate training data to the machine learning model 230 as an input. The machine learning model 230 may process the training data the weights of the machine learning model 230 may be updated, set, configured, etc., during the training process to generate a trained machine learning model 230.

Also at stage 320, a set of test data 350 may be provided to the machine learning model 230 after the machine learning model 230 has been trained using the candidate training data. For example, a set of test images may be provided to the machine learning model 230. The set of test data 350 may be used to test, evaluate, assess, etc., the performance of the machine learning model 230. For example, the test data 350 may be provided to the machine learning model 230 as an input. The machine learning model 230 may generate a set of segmentations based on or using the test data. For example, the machine learning model 230 may identify, classify, etc., different types of objects (e.g., pedestrians, vehicles, trees, buildings, bushes, etc.), traffic control devices (e.g., signs, lane markings, dividers, traffic cones, etc.), etc., that are depicted in the set of test images.

At stage 330, the segmentation module 215 may analyze the segmentations generated by the machine learning model 230 at stage 320 (using the test data 350), to determine one or more MIOUs. For example, the segmentation module 215 may analyze a first segmentation for a first image of the test data 350 (generated by the machine learning model 230) and may compare the first segmentation with a first reference segmentation for first image. The segmentation module 215 may calculate, determine, generate, etc., the MIOU for the first image based on the first segmentation and the first reference segmentation. The segmentation module 215 may also determine additional MIOUs for other images. In another example, the segmentation module may generate one MIOU for a whole set of test data (e.g., may generate one MIOU value for multiple images) based on a set of reference segmentations for the whole set of test data (e.g., based on multiple segmentations, one segmentation for each of the multiple images).

In one embodiment, an MIOU determined by the segmentation module 215 may determine the MIOU based on a subset of the different segmentations that are available. For example, there may be ten types of segmentations for a set of test data (e.g., one for pedestrians, one for vehicles, one for roads, etc.). The segmentation module 215 may use a subset of those ten types of segmentations to determine an MIOU. For example, the segmentation module 215 may use only segmentations for pedestrians and may use the IOU for that segmentation as the MIOU. In another example, the segmentation module 215 may use segmentations for pedestrians and vehicles, and may determine an MIOU based on the IOUs for those two segmentations.

Also at stage 330, the segmentation module 215 may determine whether to iterate back to stage 310 (e.g., may determine whether the process 300 should continue, should perform another iteration, loop, cycle, etc.). The segmentation module 215 may use various conditions, parameters, criterion, etc., to determine whether the process 300 should continue. For example, the segmentation module 215 may determine whether the number of times the process 300 has repeated has reached a threshold number of times (e.g., 10 times, 100 times, 1000 times, etc.). If the process 300 has been repeated the threshold number of times, the segmentation module 215 may stop the process 300.

In one embodiment, the segmentation module 215 may determine whether to iterate back to stage 310 based on one or more MIOU values. For example, the segmentation module 215 may determine whether the a MIOU value has increased by more than a threshold amount over a previous MIOU value. If the MIOU value has not increased by the threshold amount, the segmentation module 215 may determine if the MIOU value is over a threshold MIOU. If the MIOU value is over the threshold MIOU, the segmentation module 215 may add the candidate training data to a library or a set of training data and end the process 300.

In another embodiment, the segmentation module 215 may determine whether to iterate back to stage 310 based on whether the MIOU of a current iteration has reached a threshold MIOU. For example, if the MIOU is greater than or equal to a threshold MIOU, the process 300 may end. If the MIOU is less than the threshold MIOU, the process 300 may continue (e.g., iterate back to stage 310).

FIG. 4A is a diagram that illustrates example segmentations of an image 400, in accordance with one or more embodiments of the present disclosure. The segmentations of image 400 (e.g., the shaded/hatched portions of image 400) may be segmentations that are determined, generated, calculated, etc., by a machine learning model (e.g., image 400 may be test data provided to a machine learning model). The image 400 may depict a view of a portion of a simulated environment that was captured, obtained, etc., while a simulated vehicle (or other simulated object) was moving along a path in the simulated environment.

As discussed above, a simulated environment may include various objects (e.g., simulated objects, virtual objects, etc.) that are in various locations in the simulated environment. The objects may be non-deterministically generated, as discussed above. For example, the sizes, shapes, orientations, textures, etc., of the objects may be randomly selected. The weather conditions and/or lighting conditions (e.g., sources of light, locations of light sources and/or light, shadows, locations of shadows, darkness of shadows, glare, reflections, etc.) may also be non-deterministically selected or determined.

The segmentations of different objects, types of areas, locations, etc., in the image 400 are represented by the different portions of the image 400. For example, segmentation 405 may be for the sky/skyline, segmentation 410 may be for a grassy area, segmentation 415 may be for a road, segmentation 420 may be for a building, and segmentation 425 may be for a pillar (e.g., a concrete pillar). The segmentations that are shaded (e.g., segmentations 405 through 415) may be segmentations that were detected, identified, classified, etc., correctly by a machine learning model (e.g., machine learning model 230 illustrated in FIGS. 1-3). As illustrated in FIG. 4A, the segmentations 420 and 425 were not correctly classified, identified, etc., by the machine learning model.

As discussed above, the segmentations 405-425 may be generated by a machine learning model based on test data. The segmentations 405-425 may be compared with reference segmentations that may be generated by a simulation engine (e.g., the segmentations illustrated in FIG. 4B) below. The segmentations 405-425 may be compared with the reference segmentations illustrated in FIG. 4B to determine an MIOU, an intersection of union (IOU), etc.

Figure 4B:
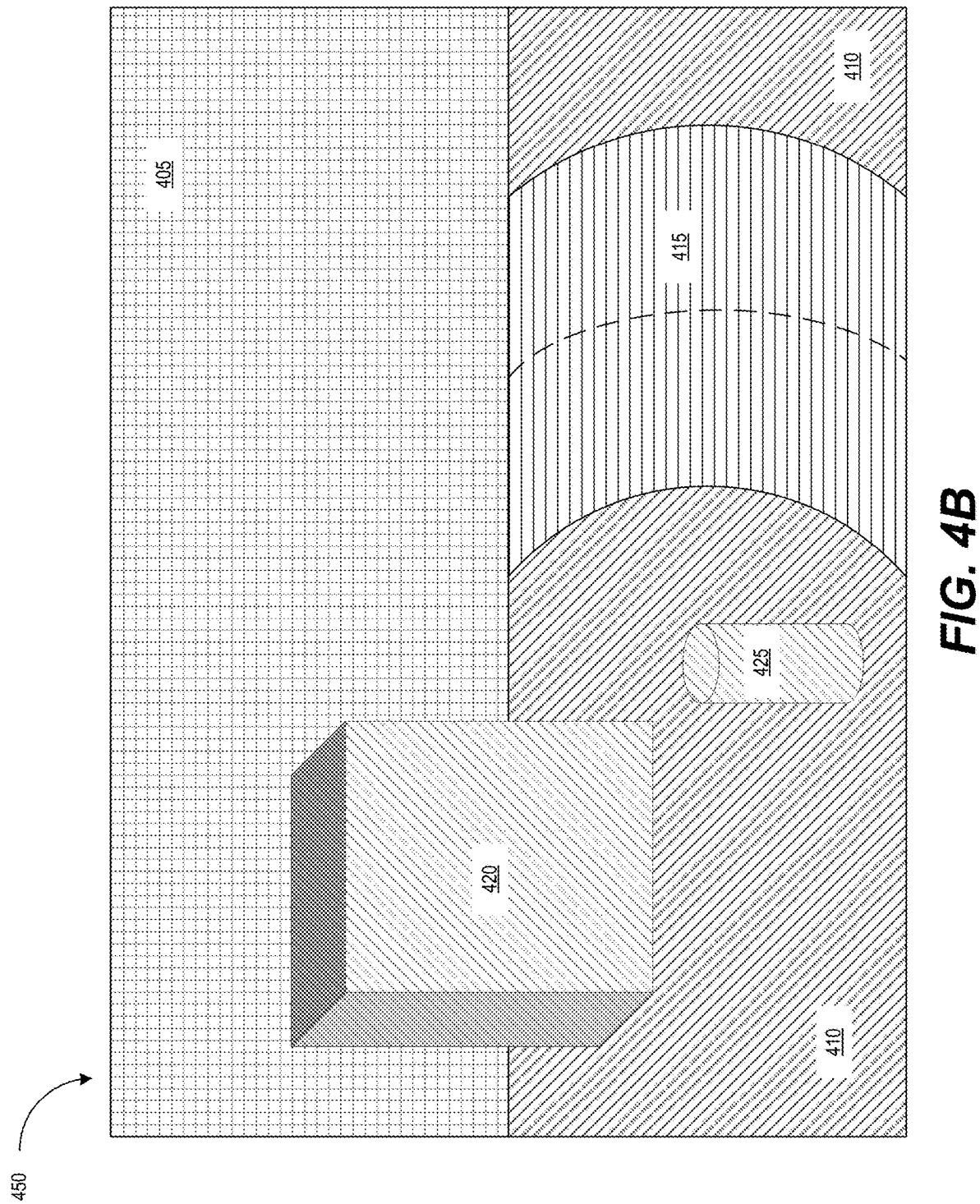
FIG. 4B is a diagram that illustrates example segmentations of an image, in accordance with one or more embodiments of the present disclosure.

FIG. 4B is a diagram that illustrates example segmentations of an image 450, in accordance with one or more embodiments of the present disclosure. The segmentations of image 450 (e.g., the shaded/hatched portions of image 450) may be reference segmentations that may be used to determine an MIOU based on the segmentations of image 400 illustrated in FIG. 4. For example, the segmentations of image 450 may be compared with the segmentations of images 400 illustrated in FIG. 4, to determine an MIOU value. The image 450 may depict a view of a portion of a simulated environment that was captured, obtained, etc., while a simulated vehicle (or other simulated object) was moving along a path in the simulated environment.

As discussed above, a simulated environment may include various objects that are in various locations in the simulated environment. The objects may be non-deterministically generated, as discussed above. The weather conditions and/or lighting conditions may also be non-deterministically selected or determined. The segmentations of different objects, types of areas, locations, etc., in the image 450 are represented by the different portions of the image 450. For example, segmentation 405 may be for the sky/skyline, segmentation 410 may be for a grassy area, segmentation 415 may be for a road, segmentation 420 may be for a building, and segmentation 425 may be for a pillar (e.g., a concrete pillar).

Figure 5:
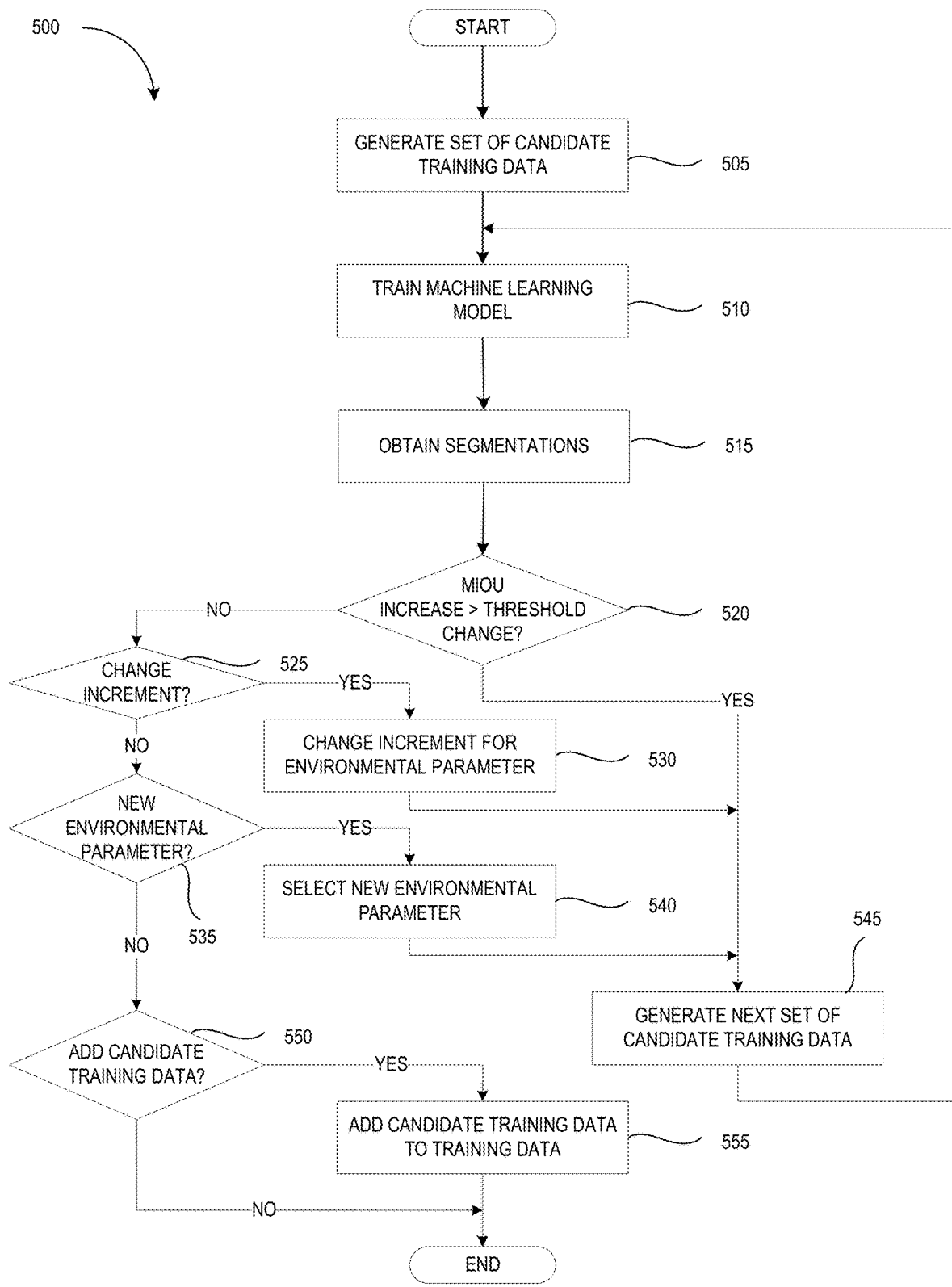
FIG. 5 is a flow diagram of a process for generating training data, in accordance with one or more embodiments of the present disclosure.

FIG. 5 is a flow diagram of a process 500 for generating training data (e.g., synthetic data or synthetic training data), in accordance with one or more embodiments of the present disclosure. Process 500 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 500 may be performed by a computing device (e.g., a server computer, a desktop computer, etc.), a data science system (e.g., data science system 110 illustrated in FIG. 1), a training data module (e.g., training data module 111 illustrated in FIGS. 1-3), and/or various components, modules, engines, systems, etc., of a training data module (as illustrated in FIGS. 1-3).

The process 500 begins at block 505 where the process 500 generates a set of candidate training data. For example, the process 500 may use a simulation engine to generate a simulated environment based on a set of environmental parameters. The process 500 may also obtain images, videos, etc., of the simulated environment to generate the set of candidate training data. At block 510, the process 500 may train a machine learning model (e.g., a neural network). For example, the set of candidate training data may be provided to the machine learning model as an input. The process 500 may obtain a set of segmentations at block 515. For example, the process 500 may provide test data (e.g., a set of test video, images, etc.) to the machine learning model (that was trained using the set of candidate training data). The machine learning model may generate the segmentations (or data that is used to obtain the segmentations) based on the training data.

At block 520, the process 500 may determine whether the MIOU has increased and/or has increased by a threshold amount/change. For example, the process 500 may compare the segmentations of test data with a set of reference segmentations for the test data. If the MIOU has increased by more than a threshold amount/change, the process 500 may generate a next set of training data at block 545. For example, one or more environmental parameters may be modified based on previous values of the environmental parameters (e.g., may be increased or decreased by 1, 0.5, 0.1, etc.). A next simulated environment may be generated based on the one or more modified environmental parameters. The process 500 may generate a next set of candidate training data based on the next simulated environment. The process 500 may then proceed to block 510 where the machine learning model may be trained using the next set of candidate training data.

If the MIOU has not increased by more than a threshold amount/change, the process 500 may determine whether an increment or step size for an environmental parameter should be changed at block 525. For example, if the same environmental parameter has been changed (e.g., increased or decreased) less than a threshold number of times, the process 500 may determine that the increment or step size for the environmental parameter should be decreased (e.g., from 1 to 0.5). In another example, if the same environmental parameter has been changed more than threshold number of times, the process 500 may determine that the increment or step size for the environmental parameter should not be changed. In other embodiments, various factors, criteria, parameters, etc., may be used to determine whether the increment should be changed. For example, a user or a configuration setting may indicate that a threshold level of precision should be used for environmental parameters (e.g., the level of precision should be to the nears tenth, hundredth, etc.). In another example, the amount of change in the MIOU (as compared to a previous MIOU) may be used to determine whether the increment (for an environmental parameter) should be changed.

If the process 500 determines that the increment or step size for the environmental parameter should be changed/modified, the process 500 may proceed to block 530 where the increment for the environmental parameter is changed (e.g., the increment or step size may be increased or decreased) at block 530. For example, environmental parameters (e.g., environmental parameters 220) may be updated to reflect the new increment or step size. If the process 500 determines that the increment or step size for the environmental parameter should not be changed/modified, the process 500 may proceed to block 535 where the process 500 may determine whether a new environmental parameter should be selected. For example, process 500 may iterate through a list, group, set, etc., of environmental parameters one by one. The process 500 may determine if there are any environmental parameters that have not been previously selected and may selected one of the environmental parameters (that were not previously selected).

If a new environmental parameter should be selected (e.g., there is at least one environmental parameters that was not previously selected), the process 500 may select the new environmental parameter at block 540 and the new environmental parameters may be modified to generate the next set of candidate training data at block 545. If a new environmental parameter should not be selected (e.g., all environmental parameters were previously selected), the process 500 may proceed to block 550 where the process 500 determines whether the set of candidate training data should be added to a set, library, etc., of training data (which may be used to train other machine learning models). For example, the process 500 may determine whether the MIOU is greater than a threshold MIOU (e.g., a desired MIOU, a minimum MIOU, etc.) or may determine if MIOU is converging to a particular value at block 550. If the MIOU is greater than the threshold MIOU (or is converting to the particular value), the process 500 may add the candidate training data to a set, library, etc., of training data (which may be used to train machine learning models). In some embodiments, the block 550 may be optional and the candidate training data may be added to a set of training data after block 535.

Figure 6:
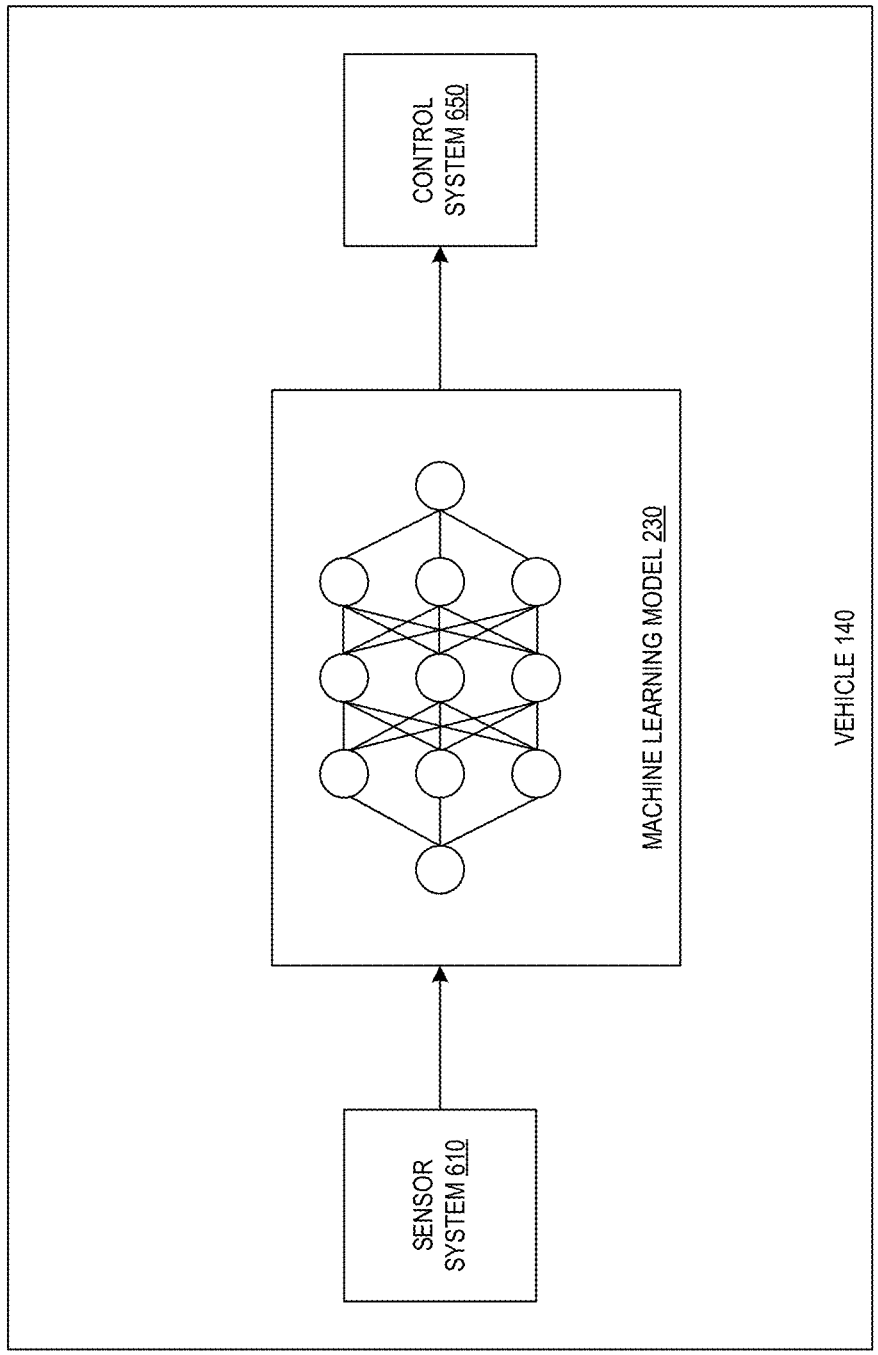
FIG. 6 is a block diagram that illustrates an example vehicle, in accordance with one or more embodiments of the present disclosure.

FIG. 6 is a block diagram that illustrates an example vehicle 140, in accordance with one or more embodiments of the present disclosure. In one embodiment, the vehicle 140 may be an autonomous vehicle (e.g., a self-driving vehicle). For example, the vehicle 140 may be a vehicle (e.g., car, truck, van, mini-van, semi-truck, taxi, drone, etc.) that may be capable of operating autonomously without intervention from and/or interaction with a user (e.g., an operator of the vehicle 140, a driver of the vehicle 140, etc.). In another embodiment, the vehicle 140 may also be a vehicle with autonomous capabilities. A vehicle 140 vehicle with autonomous capabilities may be a vehicle that may be capable of performing some operations, actions, functions, etc., autonomously. For example, vehicle 140 may have adaptive cruise control capabilities and/or lane assist/keep capabilities. A vehicle 140 with autonomous capabilities may be referred to as a semi-autonomous vehicle. The vehicle 140 may include various systems that allow the vehicle 140 to operate autonomously and/or semi-autonomously. For example, vehicle 140 includes a sensor system 610, a control system 650, and machine learning model 230.

The sensor system 610 may include one or more sensors (e.g., detectors, sensing elements, sensor devices, etc.). The one or more sensors may provide information about the operation of the vehicle 140, information about the condition of the vehicle 140, information about occupants/users of the vehicle 140, and/or information about the environment (e.g., a geographical area) where the vehicle 140 is located. The one or more sensors may be coupled to various types of communication interfaces (e.g., wired interfaces, wireless interfaces, etc.) to provide sensor data to other systems of the vehicle 140. For example, a sensor may be coupled to a storage device (e.g., a memory, a cache, a buffer, a disk drive, flash memory, etc.) and/or a computing device (e.g., a processor, an ASIC, an FPGA, etc.) via a control area network (CAN) bus. In another example, a sensor may be coupled to a storage drive and/or a computing device via Bluetooth, Wi-Fi, etc. Examples of sensors may include a camera, a radar sensor, a LIDAR sensor, etc.

The control system 650 may include hardware, software, firmware, or a combination thereof that may control the functions, operations, actions, etc., of the vehicle 140. For example, the control system 650 may be able to control a braking system and/or an engine to control the speed and/or acceleration of the vehicle 140. In another example, the control system 650 may be able to control a steering system to turn the vehicle 140 left or right. In a further example, the control system 650 may be able to control the headlights or an all-wheel drive (AWD) system of the vehicle 140 based on weather/driving conditions (e.g., if the environment has snow/rain, if it is night time in the environment, etc.). The control system 650 may use sensor data and/or outputs generated by machine learning model 230 to control the vehicle 140.

The control system 650 may use outputs generated by machine learning model 230 to control the vehicle. For example, the machine learning model 230 may generate one or more steering commands. The steering command may indicate the direction that a vehicle 140 should be turned (e.g., left, right, etc.) and may indicate the angle of the turn. The control system 650 may actuate one or more mechanisms/systems (e.g., a steering system, a steering wheel, etc.) to turn the vehicle 140 (e.g., to control the vehicle 140) based on the steering command. For example, the control system 650 may turn the steering wheel by a certain number of degrees to steer the vehicle 140.

Figure 7:
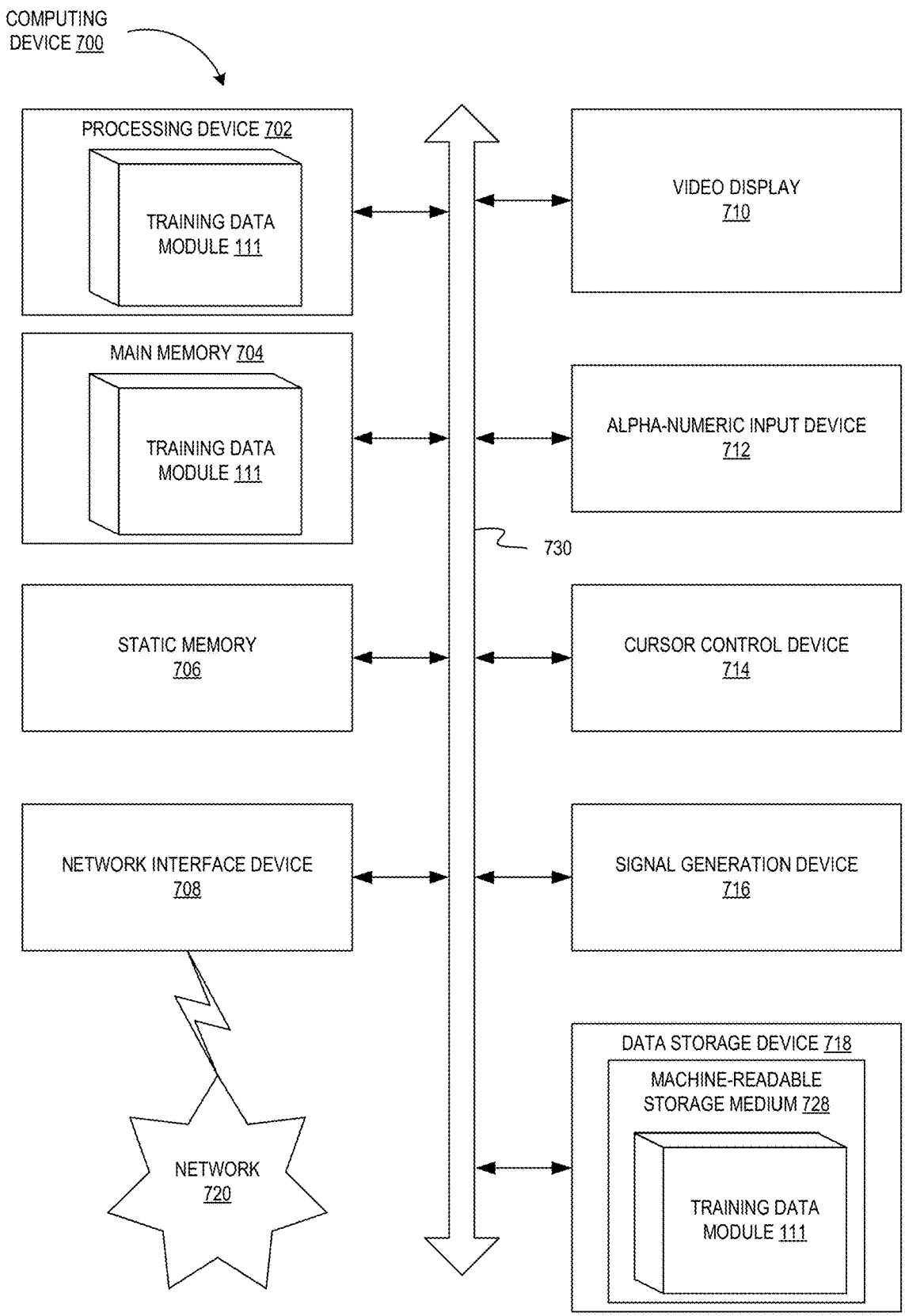
FIG. 7 is a block diagram of an example computing device that may perform one or more of the operations described herein, in accordance with some embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions for carrying out the operations described herein, in accordance with one or more aspects of the present disclosure. Instructions 726 implementing the different systems described herein (e.g., the training data module 111 illustrated in FIGS. 1-3) may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "determining," "training," "driving," "obtaining," "tagging," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
generating a set of candidate training data based on a simulated environment and a first set of environmental parameters for the simulated environment;
training a machine learning model based on the set of candidate training data;
obtaining a set of segmentations based on the machine learning model and a set of test data, wherein the set of segmentations indicate features of the simulated environment identified by the machine learning model;
determining whether a mean intersection-over-union (MIOU) of the set of segmentations has increased by more than a threshold amount;
in response to determining that the MIOU has increased by more than the threshold amount, generating a next set of candidate training data based on a next simulated environment and a next set of environmental parameters for the simulated environment; and
in response to determining that the MIOU has not increased by the threshold amount, determining whether to select a next set of environmental parameters; and
in response to determining that the next set of environmental parameters should be selected, generating the next set of candidate training data based on the next set of environmental parameters.

2. The method of claim 1, further comprising:
in response to determining that the MIOU has not increased by the threshold amount, determining whether to change an increment for the set of environmental parameters; and
in response to determining that the increment for the set of environmental parameters should be changed, changing the increment and generating the next set of candidate training data based on the changed increment.

3. The method of claim 1, wherein:
the simulated environment comprises a set of routes; and
the set of candidate training data comprises a set of images of obtained based on the set of routes within the simulated environment.

4. The method of claim 3, wherein generating the set of candidate training data based on the simulated environment comprises:
running a simulation engine, wherein:
the set of images depict views of the simulated environment along the set of routes; and
the views of the simulated environment correspond to a location of a sensor within a vehicle.

5. The method of claim 1, wherein:
the first set of environmental parameters indicate one or more of a set of locations, a set of shapes, a set of orientations, a set of colors, a set of textures and a set of sizes for a set of non-deterministically generated objects; and generating the set of candidate training data based on the simulated environment comprises:
generating the simulated environment based on one or more of the set of locations, the set of shapes, the set of orientations, the set of colors, the set of textures and the set of sizes for the set of non-deterministically generated objects.

6. The method of claim 1, wherein:
the first set of environmental parameters indicate a non-deterministically selected weather condition; and
generating the set of candidate training data based on the simulated environment comprises:
generating the simulated environment based on the non-deterministically selected weather condition.

7. The method of claim 1, wherein:
the first set of environmental parameters indicate a non-deterministically selected lighting condition; and
generating the set of candidate training data based on the simulated environment comprises:
generating the simulated environment based on the non-deterministically selected lighting condition.

8. The method of claim 1, wherein:
the first set of environmental parameters indicate a set of non-deterministically selected colors; and
generating the set of candidate training data based on the simulated environment comprises:
generating the simulated environment based on the set of non-deterministically selected colors.

9. The method of claim 1, wherein the first set of environmental parameters indicate ranges of values for each environmental parameter in the first set of environmental parameters and increments for each environmental parameter in the first set of environmental parameters.

10. The method of claim 1, further comprising:
selecting the first set of environmental parameters from a plurality of environmental parameters, based on previous MIOUs.

11. The method of claim 1, further comprising:
controlling operation of a vehicle based on the machine learning model.

12. A apparatus, comprising:
a memory configured to store data; and
a processing device coupled to the memory, the processing device configured to:
generate a set of candidate training data based on a simulated environment and a first set of environmental parameters for the simulated environment;
train a machine learning model based on the set of candidate training data;
obtain a set of segmentations based on the machine learning model and a set of test data, wherein the set of segmentations indicate features of the simulated environment identified by the machine learning model;
determine whether a mean intersection-over-union (MIOU) of the set of segmentations has increased by more than a threshold amount; and
in response to determining that the MIOU has increased by more than the threshold amount, generate a next set of candidate training data based on a next simulated environment and a next set of environmental parameters for the simulated environment; and
in response to determining that the MIOU has not increased by the threshold amount, determining whether to change an increment for the set of environmental parameters; and in response to determining that the increment for the set of environmental parameters should be changed, changing the increment and generating the next set of candidate training data based on the changed increment.

13. The apparatus of claim 12, wherein the processing device is further configured to:
in response to determining that the MIOU has not increased by the threshold amount, determine whether to select a next set of environmental parameters; and
in response to determining that the next set of environmental parameters should be selected, generate the next set of candidate training data based on the next set of environmental parameters.

14. The apparatus of claim 12, wherein:
the simulated environment comprises a set of routes; and
the set of candidate training data comprises a set of images of obtained based on the set of routes within the simulated environment.

15. The apparatus of claim 12, wherein:
the first set of environmental parameters indicate one or more of a set of locations, a set of shapes, a set of orientations, a set of colors, a set of textures, and a set of sizes for a set of non-deterministically generated objects; and
to generate the set of candidate training data based on the simulated environment the processing device is further configured to:
generate the simulated environment based on one or more of the set of locations, the set of shapes, the set of orientations, the set of colors, the set of textures, and the set of sizes for the set of non-deterministically generated objects.

16. The apparatus of claim 12, wherein:
the first set of environmental parameters indicate a non-deterministically selected weather condition; and
to generate the set of candidate training data based on the simulated environment the processing device is further configured to:
generate the simulated environment based on the non-deterministically selected weather condition.

17. The apparatus of claim 12, wherein:
the first set of environmental parameters indicate a non-deterministically selected lighting condition; and
to generate the set of candidate training data based on the simulated environment the processing device is further configured to:
generate the simulated environment based on the non-deterministically selected lighting condition.

18. A non-transitory computer-readable storage medium including instructions that, when executed by a processing device, cause the processing device to perform operations comprising:
generating a set of candidate training data based on a simulated environment and a first set of environmental parameters for the simulated environment;
training a machine learning model based on the set of candidate training data;
obtaining a set of segmentations based on the machine learning model and a set of test data, wherein the set of segmentations indicate features of the simulated environment identified by the machine learning model;
determining whether a mean intersection-over-union (MIOU) of the set of segmentations has increased by more than a threshold amount; and
in response to determining that the MIOU has increased by more than the threshold amount, generating a next set of candidate training data based on a next simulated environment and a next set of environmental parameters for the simulated environment, wherein the first set of environmental parameters indicate ranges of values for each environmental parameter in the first set of environmental parameters and increments for each environmental parameter in the first set of environmental parameters.

19. The non-transitory computer-readable storage medium of claim 18, wherein the operations further comprise:
in response to determining that the MIOU has not increased by the threshold amount, determine whether to select a next set of environmental parameters; and
in response to determining that the next set of environmental parameters should be selected, generate the next set of candidate training data based on the next set of environmental parameters.

20. The non-transitory computer-readable storage medium of claim 18, wherein the operations further comprise:
in response to determining that the MIOU has not increased by the threshold amount, determining whether to change an increment for the set of environmental parameters; and
in response to determining that the increment for the set of environmental parameters should be changed, changing the increment and generating the next set of candidate training data based on the changed increment.

* * * * *